United States Patent
Greene et al.

(10) Patent No.: US 9,672,645 B2
(45) Date of Patent: Jun. 6, 2017

(54) METHOD TO DISPLAY A GRAPH CONTAINING NODES AND EDGES IN A TWO-DIMENSIONAL GRID

(71) Applicants: Kshanti Auster Greene, West Gardiner, ME (US); Thomas Allen Young, West Gardiner, ME (US)

(72) Inventors: Kshanti Auster Greene, West Gardiner, ME (US); Thomas Allen Young, West Gardiner, ME (US)

(73) Assignee: Kshanti Greene, West Gardiner, ME (US)

( * ) Notice: Subject to any disclaimer, the term of this patent is extended or adjusted under 35 U.S.C. 154(b) by 0 days.

(21) Appl. No.: 15/206,241

(22) Filed: Jul. 9, 2016

(65) Prior Publication Data

US 2017/0024913 A1  Jan. 26, 2017

Related U.S. Application Data (60) Provisional application No. 62/197,074, filed on Jul. 26, 2015.

(51) Int. Cl.
*G06T 11/20* (2006.01)
(52) U.S. Cl.
CPC .................................. *G06T 11/206* (2013.01)
(58) Field of Classification Search
CPC ...................................................... G06T 11/206
USPC ......................................................... 345/440
See application file for complete search history.

(56) References Cited

U.S. PATENT DOCUMENTS

| | | | | |
|---|---|---|---|---|
| 5,673,217 A | * | 9/1997 | Imaizumi | G06F 17/276 365/49.15 |
| 7,024,419 B1 | | 4/2006 | Klenk | |
| 9,069,439 B2 | * | 6/2015 | Bawel | G06F 3/04815 707/812 |
| 9,329,756 B2 | * | 5/2016 | Antipa | G06F 3/0482 715/736 |
| 2004/0002818 A1 | * | 1/2004 | Kulp | G01N 33/68 702/20 |
| 2007/0043699 A1 | * | 2/2007 | Zhang | G06F 17/30554 707/999.003 |
| 2009/0013271 A1 | * | 1/2009 | Helfman | G06F 17/30572 715/764 |
| 2009/0019348 A1 | * | 1/2009 | King | G06F 3/0482 715/205 |
| 2010/0298041 A1 | * | 11/2010 | Berman | G07F 17/3265 463/20 |
| 2012/0173500 A1 | * | 7/2012 | Chakrabarti | G01C 21/3611 707/706 |

* cited by examiner

*Primary Examiner* — Jason Olson (57) ABSTRACT

A graph display system that represents graph nodes as grid cells in a two-dimensional grid. Graph edges are represented by placing the edge's nodes in adjacent grid cells, thus eliminating the entanglement of edges that are typically drawn as lines between scattered nodes. Relatedness of two nodes sharing an edge is indicated by the edge's weight. The display system prioritizes placement of higher weight edges such that more related information is grouped together in nearby grid cells. Any graph with n nodes and e edges can be displayed and browsed.

4 Claims, 9 Drawing Sheets

FIG.1

| I | B | C | J |
|---|---|---|---|
| H | A | D |   |
| G | F | E | K |
|   | L |   |   |

METHOD TO DISPLAY A GRAPH CONTAINING NODES AND EDGES IN A TWO-DIMENSIONAL GRID

BACKGROUND OF THE INVENTION

The present invention is in the technical field of data visualization. More specifically, the present invention is in the technical fields of graph visualization and human computer interaction (HCI).

Much information is stored as a graph or network, for example, semantic networks, social networks, and many types of biological networks. The World Wide Web can also be considered a graph, in which each web page is a node, and the hyperlinks between them are edges.

Existing visualizations of graph-based information are either too simplistic; i.e. they do not take into consideration the non-linear relationships between multiple pieces of information, for instance they select a portion of information from a graph and display it as a one-dimensional list, or said visualizations are too complex; i.e. they display the edges between pieces of information, becoming entangled when the structure is large or does not conform to a neat arrangement such as a tree or planar graph.

Many existing user interfaces use a grid format to display a set of icons representing distinct pieces of information or access points to information. The existing grid-based displays appear to be arranged either linearly or arbitrarily. Arranging the icons so that related items are closer to each other than unrelated items would help the user navigate the information. A graph is a natural data structure to represent the relationships between pieces of information, and is frequently used to do so.

Many device display libraries contain tools to display information in a two-dimensional grid format. This makes implementation of the present invention straightforward using a wide variety of display libraries.

A graph (also called a network) is defined as a plurality of nodes and a plurality of edges, in which any two nodes may be connected by an edge. In the present invention, a node contains a piece of information or an access point to information. An edge between two nodes indicates that their contents are directly related in some manner. The type of edge indicates the manner in which the nodes are related. Each edge is associated with a weight that indicates the degree of relatedness of the nodes that it connects. A subgraph is a subset of nodes and/or edges the graph. In the present invention, a subgraph may be displayed as a contiguous set of cells in the grid. A cell representing a node is called a node cell. A path is a subgraph containing a plurality of k>2 nodes connected by k−1 edges in a series, such that each node is connected with an edge to at least one other node, and no node is connected to more than two other nodes.

BRIEF SUMMARY OF THE INVENTION

The present invention displays complex graph-based information in a compact two-dimensional grid format.

The present invention comprises a display mechanism to represent graph nodes as grid cells in a two-dimensional grid. Graph edges are represented by placing the edge's nodes in adjacent grid cells, thus eliminating the entanglement of edges that are typically drawn as lines between scattered nodes.

An edge represents a relationship between two nodes in a graph. Relatedness of two nodes sharing an edge is indicated by the edge's weight. The present invention prioritizes placement of higher weight edges such that related information is grouped together in nearby grid cells.

The present invention will show the user that is browsing the information stored in a graph the most related subgraphs first, and will enable the user to view all remaining subgraphs.

The present invention can be used to display any graph with n nodes and e edges. All nodes and edges can be visualized by browsing, using mechanisms provided by the system.

The two-dimensional grid display of the present invention will not become more visually complex as the number of edges increases. This will occur in a traditional graph display if lines are used to represent edges.

The grid display size and number of exposed grid cells will conform to the user's device display size.

The present invention may update a user's display in response to changes in the graph.

DETAILED DESCRIPTION OF THE INVENTION

The present invention comprises an interactive graph display that places graph nodes as cells in a two-dimensional grid in which more related nodes are in closer proximity than less related nodes.

Figure 1:
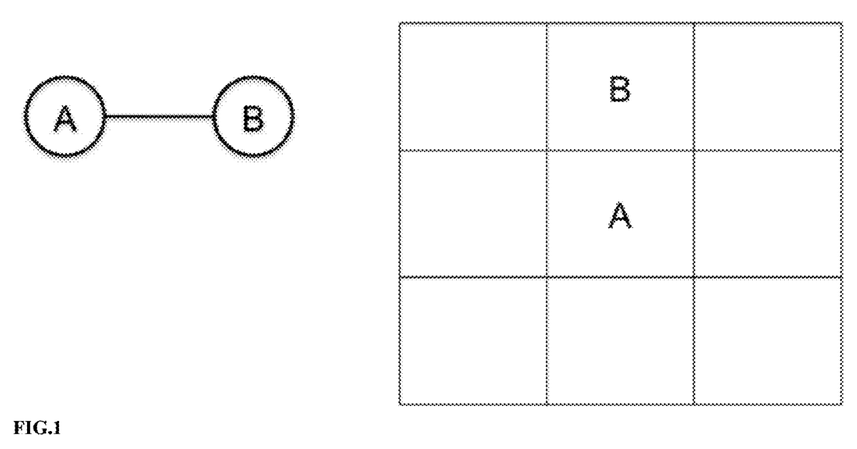
FIG. 1 is a small graph on left and its corresponding grid arrangement on right.
Figure 2:
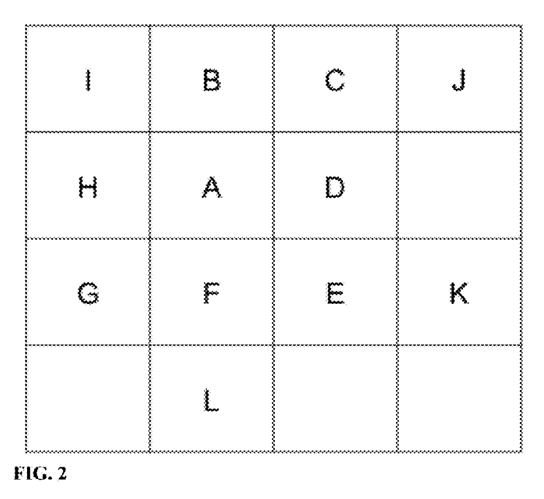
FIG. 2 is a grid arrangement to define adjacency in the present invention.

The present invention represents all edges in the graph as adjacent cells in a two-dimensional grid. Each node in the graph is represented by a node cell. As shown in FIG. 1, an edge between two nodes, A and B in a graph (figure left), is displayed by placing the node cell representing node A adjacent to the node cell representing node B (figure right). Two cells are "adjacent" if their edges or corners are proximate. For example, in FIG. 2 the cell marked A is adjacent to 8 cells, marked B, C, D, E, F, G, H, I. Adjacency is symmetric, so each of these cells is also adjacent to A. However, B is not adjacent to G. The display may contain empty cells between node cells (e.g. the unmarked cells in FIG. 2).

In the present invention, a subgraph is displayed as a group of contiguous cells. A graph may be represented by multiple, non-overlapping subgraphs. Two subgraphs P and Q are non-overlapping if no node in P is adjacent to a node in Q. Each subgraph will contain no more than one of each node in the graph, however a node may be duplicated in a separate, non-overlapping subgraph if all edges to that node cannot be represented in a single subgraph.

Figure 3:
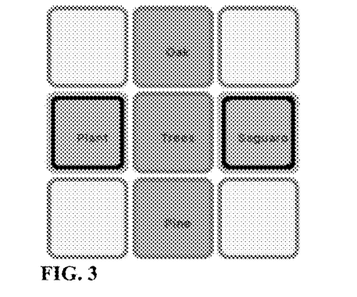
FIG. 3 is a subgraph arrangement indicating node cells that contain duplicate nodes.

A visual indicator in the node cell will distinguish a node that is duplicated in multiple subgraphs from those that only appear in one subgraph. For instance, FIG. 3 illustrates a small subgraph containing five node cells. The two node cells outlined in black contain node duplicates, while the three node cells outlined in gray contain nodes that only appear in this subgraph.

The nodes in a graph may be connected by edges of different types. If a graph is comprised of multiple edge types, the present invention allows the user to select the type(s) of edges by which to display the graph, resulting in a graph that is a subset of the original graph. The software then computes a two-dimensional cell arrangement for said graph and displays to the user the most relevant subgraph based on his or her selection criteria.

Relatedness is a function of the number of nodes, number of edges connecting the nodes, and the weight on the edges in a subgraph.

The display will indicate when there are other subgraphs to view with an interface mechanism, such as a button. If the user selects said button, the next most related subgraph will be displayed. In this manner, all nodes and edges in the original graph can be seen if the user so desires.

In the present invention, it is possible that two adjacent node cells contain nodes that are not connected by an edge in the graph. In this case, an embodiment of the present invention can choose to provide a visual indicator to distinguish adjacent node cells containing nodes that are connected by an edge in the graph (edge adjacency) from those that are not connected by an edge (non-edge adjacency). Likewise, if the user selects a plurality of edge types to display, a visual indicator on the node cell or the boundary between adjacent cells can identify the edge type. In this manner, the structure of a graph can be recreated from the arrangement created by the present invention.

The overall effect of the present invention is a flattening of a graph into a two-dimensional display, simplifying the graph visualization by eliminating the representation of edges as lines connecting scattered nodes, while maintaining the information and relationships stored in the graph.

In one embodiment of the present invention a plurality of users may access the graph concurrently time through different displays, and changes by one user may be propagated to the other users. Users that are given modify access to a graph can create new nodes in the graph by clicking on an empty cell and providing information for that node.

Figure 4:
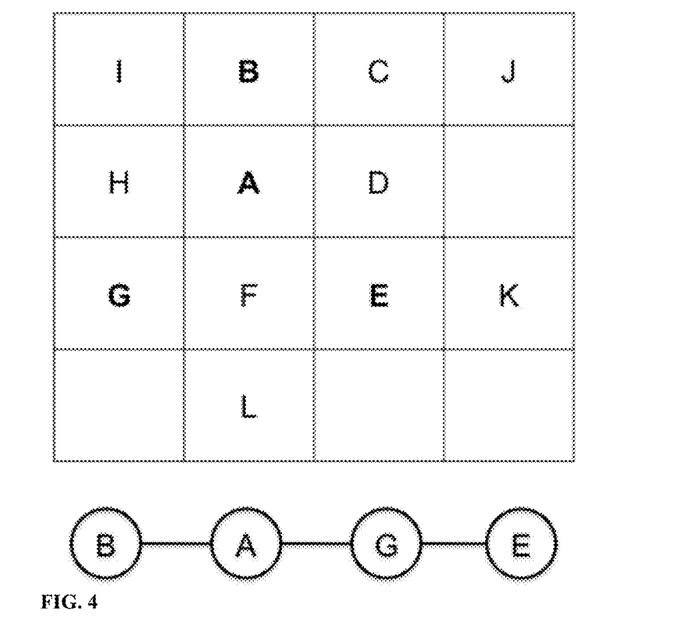
FIG. 4 demonstrates a sequence of node cell selections (B, A, G, E) and the resulting graph.

A user can also indicate a relationship between two nodes by creating a new edge connecting the nodes, or by increase the weight on an existing edge between said nodes. The user first selects the two nodes to be connected, and then selects a button or other mechanism in the display representing an edge type. The selected nodes are visually indicated in the display. The user can also connect a plurality of nodes with a path made of a series of edges by consecutively selecting two or more nodes prior to selecting the edge mechanism. For instance, referring to FIG. 4; if a user selects in order the node cells marked B, A, G, E; the software described in the invention will create edges between the nodes B and A; A and G; G and E (shown as a graph at the bottom of the figure). If at any time, an edge between two nodes that was created by a different user already exists, then the weight on the edge will be increased.

After graph modification, the software described in the present invention may re-compute the best grid arrangement and update all users' displays accordingly.

In the present invention a user can disconnect nodes that have been connected with an edge, thereby indicating a lack of relationship between said nodes. The user first selects the two or more nodes to be disconnected and then selects a button to remove the edge. If no other user has created the selected edge, the edge will be removed or its weight reduced to 0. If another user has created the selected edge, then the edge will remain in the graph, but its weight will be reduced.

Figure 5:
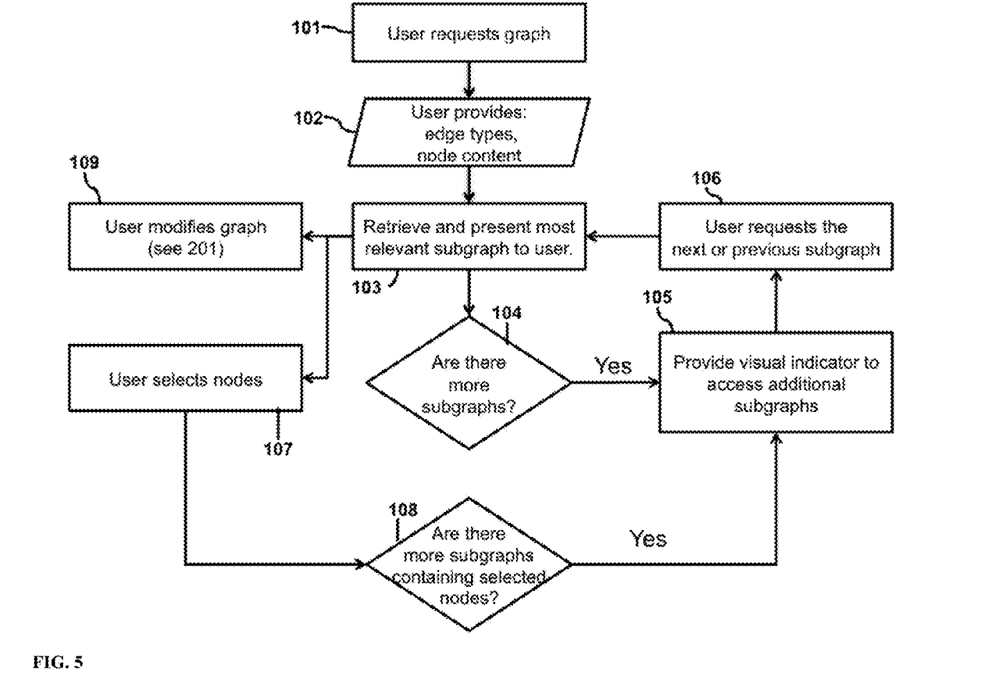
FIG. 5 is a flow chart of present invention from user's perspective.

FIG. 5 shows the flow chart of how a user interacts with the present invention.

101: The user requests to see a graph.
102: The user may select one or more edge types of interest. She may also request to see a specific node.
103: The most related subgraph based on the user's request is retrieved and displayed. If the user does not specify a node, then the most related subgraph given edge types will be displayed. Otherwise, the most related subgraph containing the node will be displayed.
104: There may be multiple subgraphs available (for instance the next most related and the previous most related subgraphs). If more subgraphs are available,
105: the invention will indicate to the user that there are additional subgraphs. For instance, an arrow indicating the direction to scroll or click to access another subgraphs. Multiple subgraphs can be viewed on the display at once if the display is large enough.
106: If user requests a different subgraph, retrieve and display (go to 103).
107: User may select one or more nodes in the visible subgraph.
108: If nodes are selected and there are additional subgraphs that contain all of the selected nodes, go to 105.
109: User modifies a graph (See FIG. 6)

Figure 6:
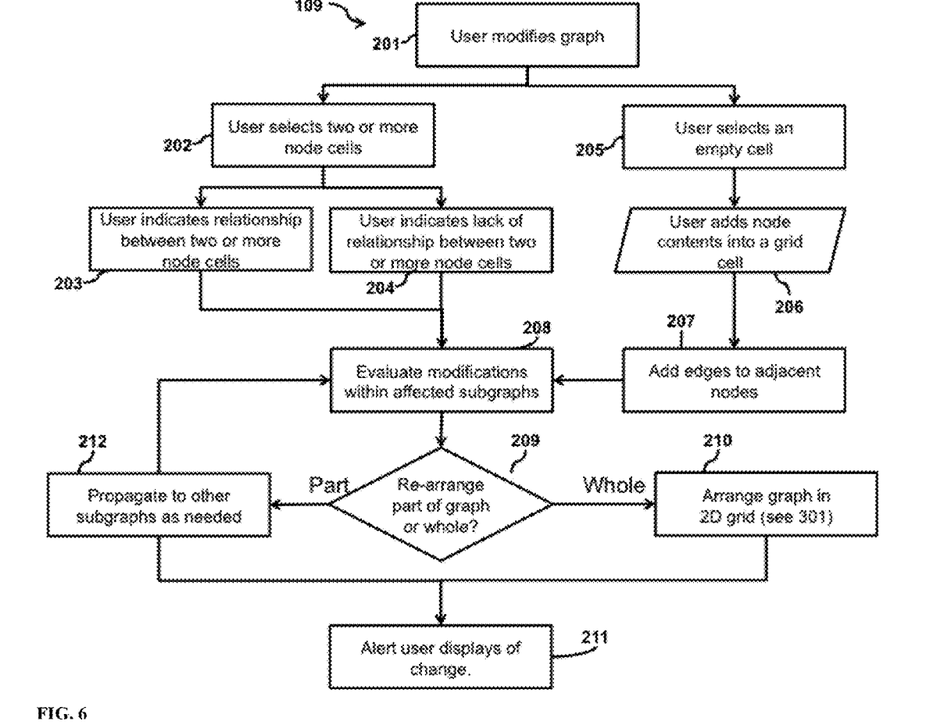
FIG. 6 is a flow chart of present invention after user modifies a graph.

FIG. 6 shows how the present invention responds to a user modifying a graph.

201: User can modify the graph in the following ways:
202: User selects two or more nodes. The selection order is maintained by the software to form a path. User can select node cells that are in different subgraphs.
203: User indicates that there is a relationship between the selected nodes. For instance, the user clicks on a button to indicate her intention to create relationships between the selected nodes.
204: User indicates that two node cells are not related (non-existent relationship). For instance, the user clicks a different button to indicate her intention to delete the relationships between the nodes represented by the selected node cells. This will typically occur with node cells that are adjacent, for which the user does not see a relationship.
205: User clicks on an empty grid cell.
206: User enters contents of a new node using an alphanumeric keyboard attached to her device.
207: Add an edge between the new node and any nodes in adjacent cells.
208: Evaluate modifications within the affected subgraphs. If the user created relationships, then add a new edge for each relationship if one does not already exist. If the edge already exists then increase the edge's weight by a predetermined amount. If the user identified a non-existent relationship, then decrease the edge's weight by a predetermined amount. If an edge weight becomes 0, the system can remove the edge from the graph.

209: The present invention will first attempt to make changes locally within the affected subgraphs. If the changes affect other subgraphs then the invention will decide algorithmically that the changes should be propagated to other subgraphs (212), or that the whole graph should be rearranged (210). Preference should lean towards localizing changes unless the changes are significant or evaluating these changes is more costly than rearranging the whole graph.

210: Rearrange the whole graph. See FIG. 7 for process.

211: Make arrangement changes within a subgraph.

Figure 7:
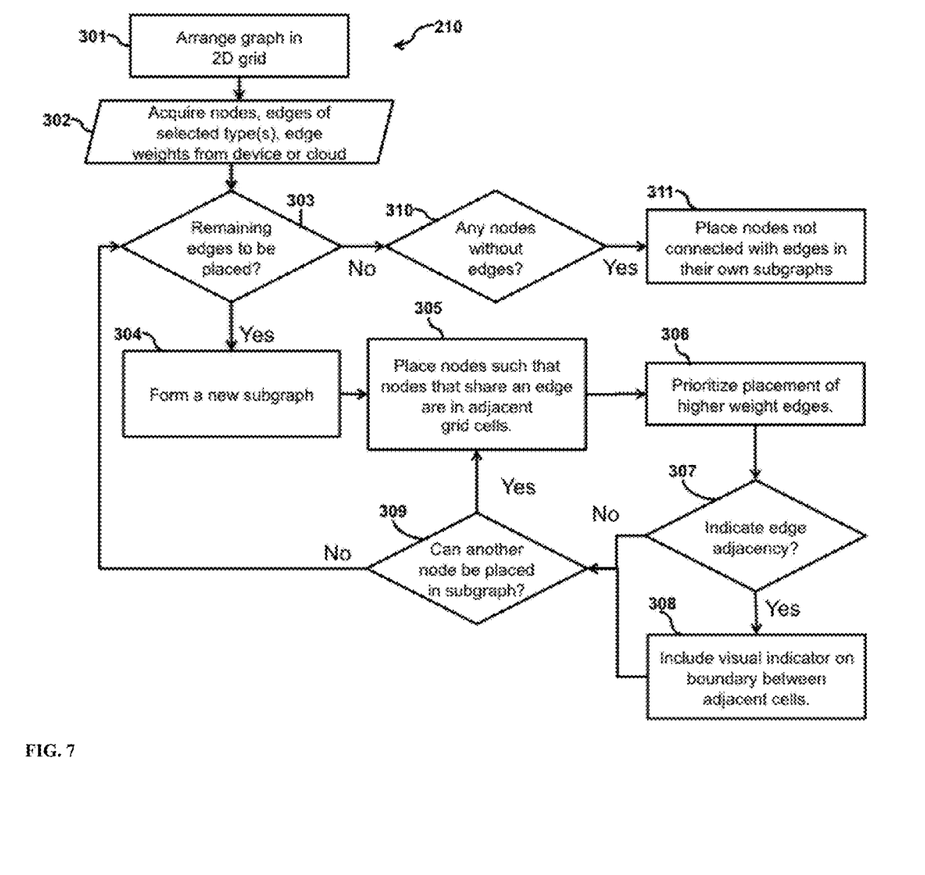
FIG. 7 is a flow chart of the present invention, arranging the graph into a two-dimensional grid.

FIG. 7 shows the flowchart for the core component of the present invention: arranging a graph on a 2D grid.

301: A signal to arrange a graph is received. This signal will originate from a user request or as the result of a graph modification.

302: Acquire the nodes and edges of the selected types from the requested graph. The graph may be stored in the cloud or on the user's device.

303: Beginning of outer loop, check if there are remaining edges in the graph to be placed.

304: Form a new subgraph with a node selected based on the algorithms used.

305: Beginning of inner loop. Place a node such that the two nodes in each edge are in adjacent positions. The exact process of arranging node cells is based on the algorithms used to implement the present invention. The arrangement algorithm is not a component of the present invention. A subgraph in grid format is comprised of a series of contiguous node cells containing node information. There shall be no more than one instance of each graph node in each subgraph. In order to place all edges in a graph, it may be necessary to place duplicates of a node in different subgraphs.

306: Higher weight edges should be given placement priority to ensure that the more related nodes are in close proximity.

307: If the embodiment is identifying edge adjacency to distinguish adjacent cells that are connected by edges (edge adjacency) from those that are not (non-edge adjacency), 308: draw the visual indicator when placing nodes within edges.

309 Determine if another node can be placed within the subgraph. A node can be placed if and only if said node shares an edge with a node already in the subgraph, and the node already in the subgraph has an empty cell adjacent to it, and the node to be placed is not already in the subgraph.

310-311: If there are remaining nodes not associated with any edges place them each in their own subgraphs (not adjacent to any other nodes).

Figure 8:
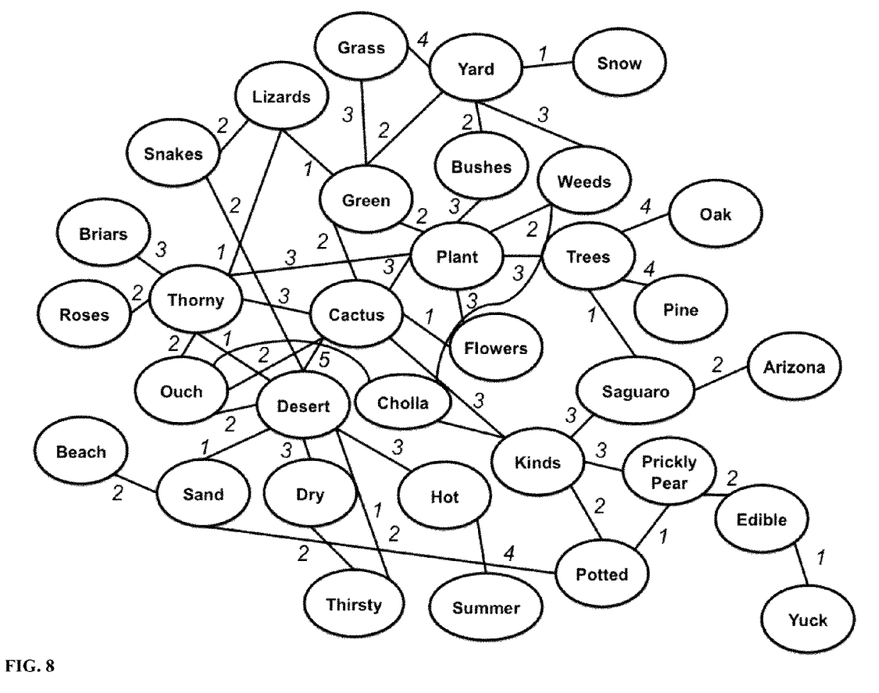
FIG. 8 is an example graph containing associations between words.

FIG. 8 shows an example graph in which nodes represent a word or concept, and edges between nodes indicate an association between the words in the nodes. The number next to each edge indicates the edge's weight, representing the strength of the association.

Figure 9:
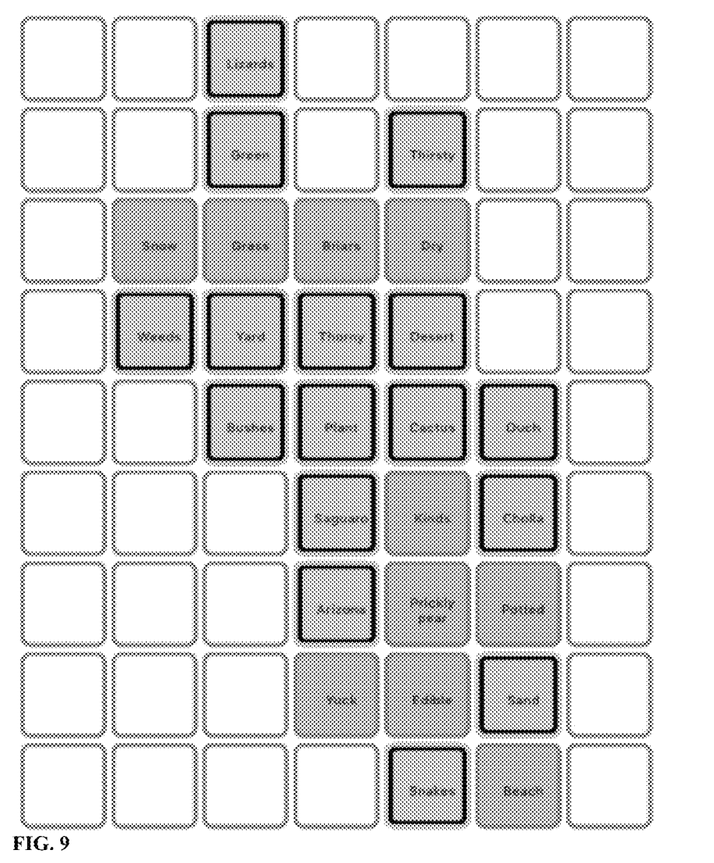
FIG. 9 is the primary subgraph from the graph in FIG. 8 arranged using the present invention.

FIG. 9 shows the primary subgraph in a two-dimensional display, generated using the present invention from the graph in FIG. 8. The dark edges indicate that the node in the node cell is duplicated in another subgraph. This display is generated without distinguishing edge adjacency from non-edge adjacency. FIG. 3 shows an additional subgraph generated from the graph in FIG. 8.

Figure 10:
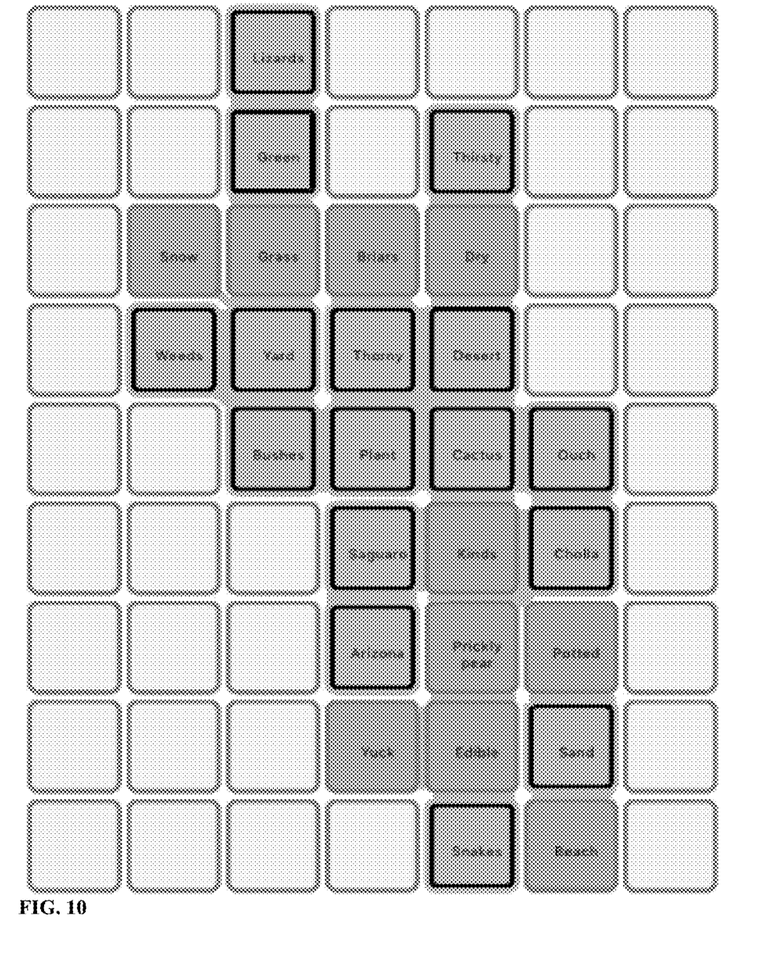
FIG. 10 is the subgraph in FIG. 9, distinguishing edge adjacency from non-edge adjacency.

FIG. 10 shows the subgraph from FIG. 9 with edge adjacency distinguished from non-edge adjacency. Adjacent node cells that share an edge are indicated with a gray boundary or line. For example, the filled boundary between Bushes and Yard indicates that the nodes share an edge. The boundary between Yard and Thorny is white, indicating that the two nodes do not share an edge. The decision of whether to distinguish edge adjacency from non-edge adjacency depends on the intent of the visualization. If the ability to place groups of nodes that are related in close proximity, based on information in the graph, is all that is desired and visual simplicity is preferred, then distinguishing edge adjacency is not necessary. However, if the intent is to be able to recreate the structure of a graph from the grid, then distinguishing edge adjacency from non-edge adjacency may be desired.

Figure 11:
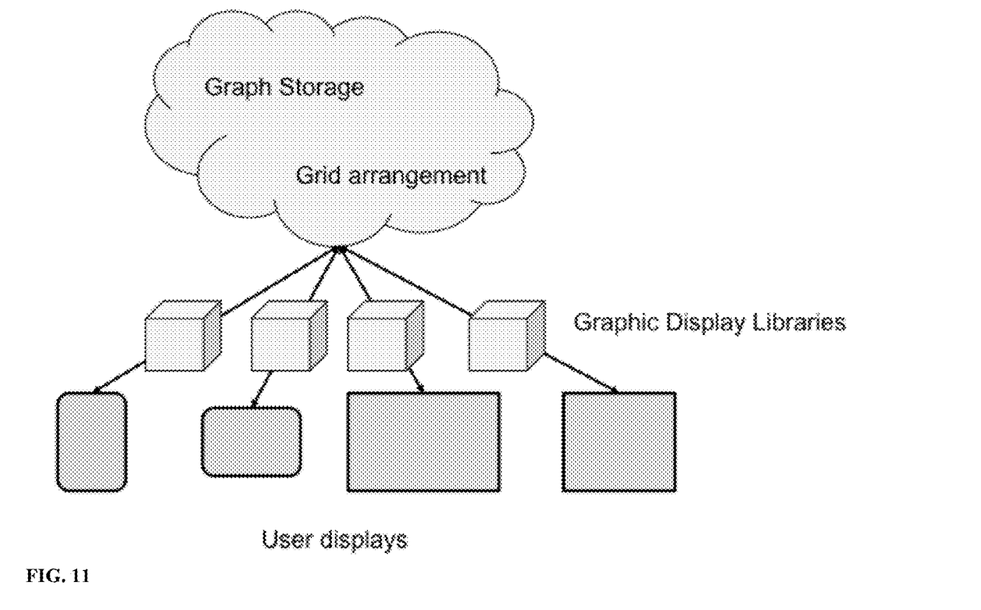
FIG. 11 is a computer architecture comprising the first embodiment of the present invention.

FIG. 11 illustrates contains a high-level computer architecture containing the first embodiment of the present invention. Graphs are stored in a cloud service architecture. The cloud service manages the specific location of the data and computing routines. The grid arrangement routines can be located in the cloud service, or on a user's device. There may be a plurality of users on separate devices accessing the invention concurrently. Requests from each user are sent via a computer network. Once computed, the grid arrangement is sent to the device of each user who requested to view a graph. The invention is device agnostic. The implementation will use graphic display libraries available for the specific display to present the grid arrangement to the user.

Figure 12:
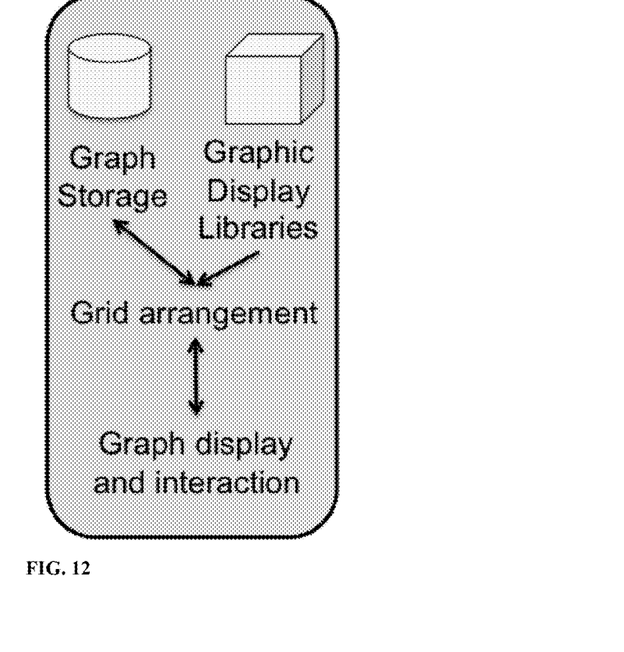
FIG. 12 is a computer architecture comprising the second embodiment of the present invention.

FIG. 12 illustrates a high-level computer architecture containing the second embodiment of the present invention. Graphs are stored on a user's device in a local database. The grid arrangement routines are stored on the user's device. In this embodiment, one user can access the invention on each device. The graphs are not shared among users or devices.

While the foregoing written description of the invention enables one with sufficient knowledge of programming, graphical display devices, and graph theory to make and use what is considered presently to be the best mode thereof, those of such skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A computer implemented method to arrange and display a graph, comprising a plurality of nodes and a plurality of edges in a two-dimensional grid containing grid cells:
   wherein said display represents each node in said graph as the contents of a grid cell in a grid; whereby a node is placed when it has been added to a grid cell;
   wherein said display represents each edge connecting two nodes in said graph as adjacent grid cells in said grid; whereby an edge is placed when its two nodes have been placed in adjacent grid cells;
   wherein each cell adjacent to a cell is given an order of placement;
   wherein, a plurality of nodes arranged in a contiguous group of grid cells comprises a subgraph;
   the steps comprising:
      determining that said graph contains unplaced edges;
      identifying a first node in one of said unplaced edges and placing said node in the center cell of an empty grid;
      identifying the highest ranking edge connecting said first node with another node;

placing the unplaced node in said edge in the lowest ordered grid cell adjacent to the grid cell containing said first placed node;

determining that there exist one or more edges connecting one of the nodes already placed in said grid with one of the nodes not yet placed in said grid;

identifying the highest ranking edge of said edges;

identifying the grid cell containing the already placed node in said edge;

determining that there exists one or more unused grid cells adjacent to said grid cell;

identifying the lowest ordered grid cell of said unused grid cells; and placing said unplaced node in said edge in said unused grid cell.

2. The computer implemented method of claim 1, further comprising the steps of:

determining that the cell in which a node is about to be placed is on the first or last row or the first or last column of said grid; and expanding the grid to provide additional space for nodes based on the determining step.

3. The computer implemented method of claim 1, wherein the grids are ordered by rank, comprising the following steps:

displaying the highest ranking grid;

determining that a lower ranking grid is available and, upon receiving input from the user, displaying said lower ranking grid; and determining that a higher ranking grid is available and, upon receiving input from the user, displaying said higher ranking grid.

4. The computer implemented method of claim 1 further comprising the steps of:

determining a change made to the displayed graph;

re-arranging said graph, and;

re-displaying said graph, whereby said change may include:
    adding a new node to said graph;
    removing a node from said graph;
    adding a new edge to said graph;
    removing an edge from said graph; or
    changing the rank of an edge in said graph.

* * * * *